United States Patent Office 3,448,156
Patented June 3, 1969

3,448,156
PREPARATION OF NAPHTHALENE
POLYALDEHYDES
Peter R. Taussig, Mountainside, N.J., and Phillip W. Storms, Dickinson, Tex., assignors to Marathon Oil Company, Findlay, Ohio, a corporation of Ohio
No Drawing. Continuation-in-part of application Ser. No. 411,562, Nov. 16, 1964. This application Feb. 21, 1968, Ser. No. 707,284
Int. Cl. C07c 47/52, 63/36, 25/14
U.S. Cl. 260—599   4 Claims

ABSTRACT OF THE DISCLOSURE

The present invention comprises a process for the preparation of naphthalene polyaldehydes from the corresponding polymethyl naphthalenes comprising liquid phase bromination of polymethyl naphthalenes where the concentration of the polymethyl naphthalenes is from about 1 to 30% by weight of the reaction mixture with elemental bromine at from 0 to about 300° C. in non-polar inert reaction media in the presence of a free radical initiator with removal of HBr as it is formed and with the concentration of unreacted bromine in the reaction mixture being maintained at below about 10% by weight based on the weight of the unreacted polymethyl naphthalenes to form poly(dibromomethyl) naphthalenes and thereafter dissolving said poly(dibromomethyl) naphthalenes in water-ionizable solvent which is liquid at the reaction conditions, and which substantially dissolves said poly(dibromomethyl) naphthalene, treating with at least a stoichiometric amount of dilute aqueous mineral acid and recovering the naphthalene polyaldehydes thus formed.

This is a continuation-in-part of our copending application, Ser. No. 411,562, filed Nov. 16, 1964, by Peter R. Taussig and Phillip W. Storms and now abandoned.

The present invention relates to the preparation of new derivatives of naphthalene and in particular relates to the preparation of naphthalene polyaldehydes and certain of their derivatives from polymethyl naphthalenes.

Our copending application of the same assignee, Ser. No. 411,544, filed Nov. 16, 1964, by Peter R. Taussig and Phillip W. Storms and now abandoned, discloses the preparation of polybromoalkyl naphthalenes. The present invention utilizes the discovery that the poly(dibromomethyl) naphthalene products can be converted in high yields to the corresponding naphthalene polyaldehydes which are highly useful starting materials for a variety of novel compounds, including among others: hydroxymethyl carboxynaphthalenes.

Among the naphthalene polyaldehydes and other oxy substituted naphthalenes produced by the process of the present invention are:

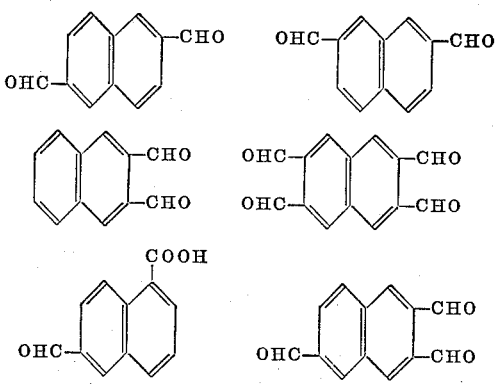

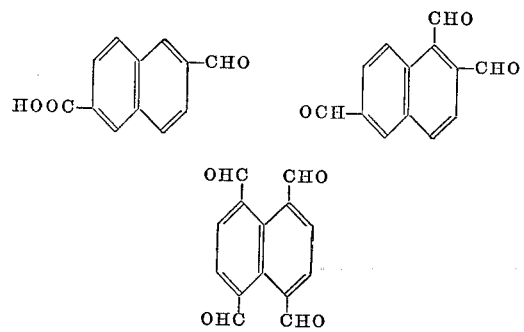

In the practice of this invention, polybromomethyl-naphthalenes are prepared as stated in the above cited application Ser. No. 411,544, and the following five paragraphs and structural formulae are taken therefrom.

The new process comprises the bromination of polyalkyl naphthalenes with elemental bromine in dilute solution in non-polar, inert reaction media in the presence of a free radical initiator with removal of the HBr thus formed. By the carefully controlled conditions of concentration, reaction media, and free radical initiator, bromination which would be expected to occur when alkyl naphthalenes are treated with bromine is virtually prevented, and the bromination occurs on the side-chains.

The concentration of the polyalkyl naphthalenes in the reaction media should be from about 1 to about 30% by weight with concentrations of 5 to 10% being preferred. The bromine should be added slowly, preferably over a period of several hours, in order to minimize the concentration of unreacted bromine present in the reaction mixture at all times. Preferably, this concentration should not exceed about 10% by weight and most preferably should be below 1% by weight based on the unreacted polyalkyl naphthalene in the reaction mixture. The molar ratio of total bromine added to polyalkyl naphthalenes will depend upon the average number of alkyl groups in the naphthalenes and the degree of bromination sought in the final product. In general, it is preferable to maintain a low degree of bromination, separate the desired products, and recycle the less brominated compounds for further bromination. Because the bromination occurs most readily on the carbon atom alpha to the aromatic ring, the process of the present invention is especially preferred for the production of alpha brominated alkyl naphthalenes. In general, on a particular alkyl group, the second bromine substitutes less readily than does the first, and the third bromine substitutes several times less readily than does the second. The temperature should not exceed 300° C. and will preferably be maintained at from 0 to about 150° C. The reaction will normally be run at atmospheric pressure under reflux conditions but may be accomplished at pressures of from 1 to 5 atmospheres or even higher provided that provision for the removal of the HBr formed during the reaction is provided.

By non-polar, inert reaction media is meant liquids which have zero or a very low dipole moment and which are virtually non-reactive with elemental bromine. Suitable reaction media include, among others: carbon tetrachloride, 1,1,2,2-tetrachloro-1,2-difluoroethane, benzene, pentachloroethane, and 1,1,2-trichloro-1,2,2-trifluoroethane.

Suitable free radical initiators include both visible and ultra-violet light, that is, electromagnetic reaction of from about 2,500 to 7,500 A. and various well-known free radical donor compounds such as benzyl peroxide, and azobisisobutylnitrile.

Among the alkyl-brominated polalkyl naphthalenes which can be readily made according to the process of the present invention are:

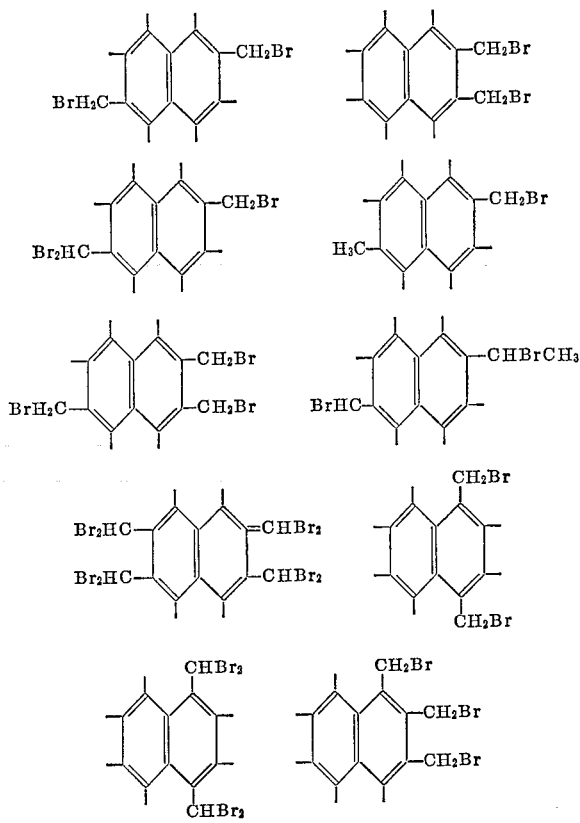

In a preferred embodiment of the invention, 2,6-dimethylnaphthalene is the polymethyl napthalene feed to be brominated as described above. Thus, 2,6-bis(dibromomethyl) naphthalene can be prepared in a reaction media consisting of carbon tetrachloride, in the presence of a free radical initiator consisting of benzoyl peroxide, at a temperature of about 100° C. under reflux conditions with the bromine being added slowly to maintain the ratio of bromine to unreacted dimethyl naphthalene below 1% by weight at all times, and with nitrogen being sparged into the reaction mixture to continuously remove the HBr by-product as it is formed. The bromination is continued until a substantial quantity of 2,6-bis(dibromomethyl) naphthalene is produced, and this compound is separated from the product mixture by conventional means, for example, by fractional crystallization. The 2,6-bis(dibromomethyl) naphthalene thus produced is dissolved in and preferably refluxed with from 10 to 50 and preferably from 25 to 35 moles of concentrated water-ionizable acid or water-ionizable base per mole of 2,6-bis(dibromomethyl) naphthalene.

By water-ionizable acid or water-ionizable base is meant a compound or mixture of compounds [hereinafter collectively referred to as water-ionizable solvents(s)] which is liquid at the reaction conditions and which is capable of dissolving reasonable amounts of the poly(bromoalkyl) aromatic, and which forms ions when it is mixed with water. Among the preferred water-ionizable solvents for use in the present invention are glacial acetic acid, methanol containing an acid, methanol containing a base, ethanol containing a base, and dioxane-water-base mixture, with the glacial acetic acid being most preferred. Propionic acid and formic acid are additional examples of preferred water-ionizable acids (water-ionizable solvents) which are useful for this invention and which are enumerated in application Ser. No. 411,561, filed Nov. 16, 1964, by Peter R. Taussig and Phillip W. Storms and now abandoned. The reflux temperature is approximately 70 to 110° C. but, of course, varies with the particular water-ionizable base or water-ionizable acid and poly(dibromomethyl) aromatic compound utilized. The reaction time is from about 10 minutes to about 24 hours and preferably from about 1 to 5 hours. The by-product, hydrogen bromide, formed during this reaction is preferably removed as it is formed by sparging the reaction mixture continuously with nitrogen or other inert gas, or by excess base in the mixture, or by other conventional means. At the end of the above reaction time the product mixture is added to from 1 to about 3 volumes of dilute aqueous mineral acid (not less than a stoichiometric amount) and the aqueous mixture is then stirred for from 15 minutes to about 5 hours, more preferably from 30 minutes to 1 hour and thereafter filtered conventionally. In preparing the aqueous mineral acid, water is preferably acidified to a pH of about 0.5 to 5 and more preferably from 1 to 2 by the addition of the above-mentioned acids. The solids recovered by filtration contain the crude naphthalene dialdehyde in substantial yields. The crude dialdehyde is purified by recrystallization from a water-dioxane or other suitable solvent solution to produce a white, solid, substantially pure 2,6-naphthalene dialdehyde having a melting point of about 173 to 174° C.

The naphthalene dialdehydes of the present invention may be further reacted to produce new mixed difunctional naphthalenes substituted with both hydroxy and carboxy groups. These mixed difunctional naphthalenes are useful as starting materials in a wide variety of organic syntheses and especially are useful as starting materials for polymers.

The hydroxy carboxynaphthalenes of the present invention are prepared from the above described naphthalene polyaldehydes by Cannizzaro-type reaction with a base, preferably an alkali metal hydroxide and most preferably potassium hydroxide. A reaction media, preferably water and most preferably water-dioxane mixture, is employed and reflux conditions are preferred. The reaction time will be from 10 minutes to 24 hours with times of from about 3 to about 8 hours being preferred. About 10 to 100 holes of base will be employed for each mole of aldehyde groups substituted on the naphthalene nucleus.

As illustrated by Example II, the reaction will normally produce some quantity of dicarboxynaphthalene. In order to maximize the hydroxy:carboxy group ratio in the finished product, another aldehyde not having an alpha hydrogen (in order to minimize side reactions which might be entered into by an alpha hydrogen) can be added to the reaction mixture. Preferred aldehydes not having an alpha hydrogen are benzaldehyde, and, most preferred, formaldehyde. The second aldehyde will preferably be added in amounts of from about 1 to 10 moles per mole of aldehyde group to be substituted on the naphthalene nucleus in the product mix. As illustrated in Examples III and IV, the presence of the second aldehyde substantially reduces the formation of carboxy groups and also enhances the production of the mixed polyfunctional naphthalene derivatives containing both hydroxy and carboxy groups. Addition of higher amounts of the second aldehyde as illustrated by Example IV tends to further reduce the production of the diacids until they are virtually not present in the product mixture.

Although the invention has been illustrated with dimethylnaphthalenes, it should be understood that polymethyl naphthalenes in general including tri-, tetra- and other polymethyl naphthalenes may be utilized. Also, while the invention has been described in terms of naphthalene derivatives, it appears probably that poly-cyclic aromatics other than naphthalene including fused ring types such as anthracene or phenanthrene and diaromatic types such as dinaphthalenes and other ring structures connected together at a single carbon atom, are operative with the present invention.

Example I 2,6-bis(dibromomethyl) naphthalene (75 grams) is refluxed in 500 ml. of glacial acetic acid for four hours. Hydrogen bromide is removed as evolved by purging the reaction mixture with nitrogen. The reaction mixture is then added to three volumes of water containing a small quantity of dilute hydrochloric acid. This water-acetic acid mixture is stirred for one-half hour and filtered. Crude dialdehyde (25 grams, 86%) is recovered. Recrystallization from water-dioxane solution gives a white solid, melting point 173 to 174° C.

Example II 2,6-naphthalene dialdehyde (10 grams), dioxane (20 ml.), potassium hydroxide (30 grams), and water (200 ml.) are stirred and refluxed for six hours. The reaction mixture is then extracted several times with ether and the ether extracts dried and concentrated. The 2,6-bis(hydroxymethyl) naphthalene recovered from the ether extract weighs 3.4 grams (34% yield) and has a melting point of 165 to 170° C. Acidification of the water layer precipitates a mixture of acids which are extracted twice with dioxane. The dioxane contains 6-hydroxy-methyl-2-carboxynaphthalene (4.4 grams or 44%). The dioxane insoluble acid (3.7 grams) is 2,6-dicarboxynaphthalene.

Example III 2,6-naphthalene dialdehyde (10 grams), 40% aqueous formaldehyde (9.0 grams), dioxane (50 ml.), potassium hydroxide (50 grams), and water (200 ml.) is refluxed overnight and extracted with ether. The ether extract yields 3.4 grams (34%) of 2,6-bis(hydroxymethyl) naphthalene. Acidification of the reaction mixture precipitates a mixture of acids which on extraction with dioxane yields 2,6-dicarboxynaphthalene (2.5 grams), and 6-hydroxymethyl-2-carboxynaphthalene (4.8 grams or 43.6%). The recrystallization of the crude 6-hydroxymethyl-2-carboxy-naphthalene from methanol gives a white solid, melting point 244 to 246° C. The neutralization equivalent found is 204 compared to a theory of 202.

Example IV 2,6-naphthalene dialdehyde (10 grams), 45% aqueous formaldehyde (45 grams), dioxane (150 ml.), potassium hydroxide (50 grams), and water (200 ml.) are stirred together at 70° C. for at least three and one-half hours. The reaction mixture is extracted with ether to yield 8.3 grams (83%) crude 2,6-bis(hydroxymethyl) naphthalene. The reaction mixture is then acidified to yield 1.0 gram (10%) of 2-hydroxymethyl-6-carboxynaphthalene. No 2,6-dicarboxynaphthalene is formed under these conditions.

What is claimed is:

1. A process for the preparation of naphthalene polyaldehydes from the corresponding polymethyl naphthalenes comprising liquid phase bromination of polymethyl naphthalenes where the concentration of the polymethyl naphthalenes is from about 1 to 30% by weight of the reaction mixture with elemental bromine at from 0 to about 300° C. in non-polar inert reaction media in the presence of a free radical initiator with removal of HBr as it is formed and with the concentration of unreacted bromine in the reaction mixture being maintained at below about 10% by weight based on the weight of the unreacted polymethyl naphthalenes to form poly(dibromomethyl) naphthalenes and thereafter dissolving said poly(dibromomethyl) naphthalenes in water-ionizable solvent which is liquid at the reaction conditions, and which substantially dissolves said poly(dibromomethyl) naphthalene, treating with at least a stoichiometric amount of dilute aqueous mineral acid and recovering the naphthalene polyaldehydes thus formed.

2. The process of claim 1 wherein the polymethyl naphthalene comprises at least 50% by weight dimethylnaphthalene.

3. The process of claim 1 wherein the water-ionizable solvent is glacial acetic acid.

4. The process of claim 3 wherein the polymethyl naphthalene comprises at least 50% by weight 2,6-dimethyl naphthalene, the water-ionizable acid comprises glacial acetic acid, and the product comprises 2,6-naphthalene dialdehyde.

References Cited

UNITED STATES PATENTS 3,288,823  11/1966  Vanderwerff ____ 260—599 XR

BERNARD HELFIN, *Primary Examiner.*

U.S. Cl. X.R.

204—163; 260—515, 520, 618, 651

UNITED STATES PATENT OFFICE
CERTIFICATE OF CORRECTION

Patent No. 3,448,156　　　　　　　　　　　　　　　　June 3, 1969

Peter R. Taussig et al.

It is certified that error appears in the above identified patent and that said Letters Patent are hereby corrected as shown below:

Column 2, lines 1 to 6, the second formula should appear as shown below:

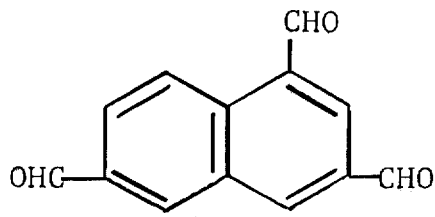

Column 3, lines 19 to 24, the second formula should appear as shown below:

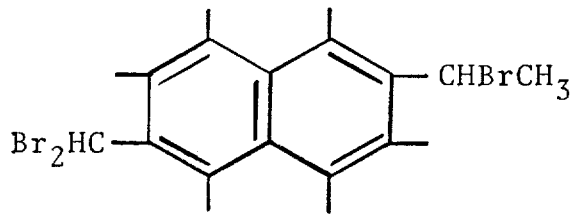

same column 3, lines 24 to 30, the first formula should appear as shown below:

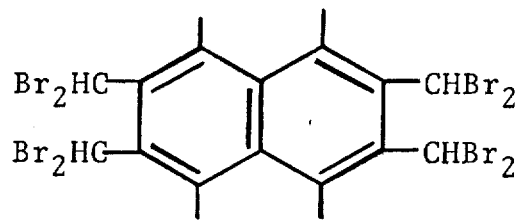

Column 4, line 42, "holes" should read -- moles --.

Signed and sealed this 31st day of March 1970.

(SEAL)
Attest:

EDWARD M. FLETCHER, JR.
Attesting Officer

WILLIAM E. SCHUYLER, JR.
Commissioner of Patents